US010732260B2

(12) United States Patent
Ajanoh et al.

(10) Patent No.: US 10,732,260 B2
(45) Date of Patent: Aug. 4, 2020

(54) RADAR CALIBRATION SYSTEMS AND METHODS

(71) Applicant: GM GLOBAL TECHNOLOGY OPERATIONS LLC, Detroit, MI (US)

(72) Inventors: Pelkins Ajanoh, Arlington, TX (US); Robert Reagan, III, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 263 days.

(21) Appl. No.: 15/695,822

(22) Filed: Sep. 5, 2017

(65) Prior Publication Data

US 2019/0072645 A1   Mar. 7, 2019

(51) Int. Cl.
| G01S 7/40 | (2006.01) |
| G01S 13/931 | (2020.01) |
| G01S 7/41 | (2006.01) |
| G06N 3/04 | (2006.01) |
| G06N 3/08 | (2006.01) |

(52) U.S. Cl.
CPC .............. *G01S 7/40* (2013.01); *G01S 7/417* (2013.01); *G01S 13/931* (2013.01); *G06N 3/04* (2013.01); *G06N 3/0454* (2013.01); *G06N 3/084* (2013.01); *G06N 3/088* (2013.01)

(58) Field of Classification Search
CPC .......... G01S 7/40; G01S 7/417; G01S 13/931; G01S 7/412; G06N 3/04; G06N 3/0454; G06N 3/084; G06N 3/088; G06N 3/086
See application file for complete search history.

(56) References Cited

U.S. PATENT DOCUMENTS

| 6,085,151 A | * | 7/2000 | Farmer | G01S 7/023 342/70 |
| 6,366,236 B1 | * | 4/2002 | Farmer | G01S 7/417 342/118 |
| 2015/0120137 A1 | * | 4/2015 | Zeng | G05D 1/024 701/41 |
| 2016/0375592 A1 | * | 12/2016 | Szatmary | B25J 5/00 700/255 |
| 2017/0060254 A1 | * | 3/2017 | Molchanov | G06F 3/011 |

OTHER PUBLICATIONS

Convolutional Clustering for Unsupervised Learning, Aysegul Dundar, Purdue University, Feb. 16, 2016 (Year: 2016).*

* cited by examiner

*Primary Examiner* — Vladimir Magloire
*Assistant Examiner* — Michael W Justice
(74) *Attorney, Agent, or Firm* — Lorenz & Kopf, LLP

(57) ABSTRACT

Systems and method are provided for calibrating a radar system of an autonomous vehicle. In one embodiment, a method includes: obtaining, by a processor, a training set of data from at least one radar system; processing, by a processor, the training set with a machine learning method to obtain centroids of interdependent clusters within the training set; and calibrating, by a processor, the radar system based on the centroids.

12 Claims, 4 Drawing Sheets

RADAR CALIBRATION SYSTEMS AND METHODS

INTRODUCTION

The present disclosure generally relates to radar for vehicles, and more particularly relates to systems and methods for calibrating a radar system to a vehicle.

An autonomous vehicle is a vehicle that is capable of sensing its environment and navigating with little or no user input. An autonomous vehicle senses its environment using sensing devices such as radar, lidar, image sensors such as cameras, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While recent years have seen significant advancements in radar systems of the autonomous vehicles and other vehicles, such systems might still be improved in a number of respects. For example, in some instances calibration of an individual radar capable of sufficient resolution involves sampling by the radar of as many as 11,011 radar samples for as long as 2.6 s per sample; and using the sampled radar returns to calibrate the radar using a common calibration procedure. This calibration process, which is based on measurement and analysis of the transmit and receive pulses, is a very time consuming process that must be run during the production process when a radar systems are to be calibrated to a vehicle environment.

Accordingly, it is desirable to provide improved systems and methods for calibrating a radar system of a vehicle. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for calibrating a radar system of an autonomous vehicle. In one embodiment, a method includes: obtaining, by a processor, a training set of data from at least one radar system; processing, by a processor, the training set with a machine learning method to obtain centroids of interdependent clusters within the training set; and calibrating, by a processor, the radar system based on the centroids.

In one embodiment, a system includes: a first non-transitory module that, by a processor, obtains a training set of data from at least one radar system; a second non-transitory module that, by a processor, processes the training set with a machine learning method to obtain centroids of interdependent clusters within the training set; and a third non-transitory module that, by a processor, calibrates the radar system based on the centroids.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
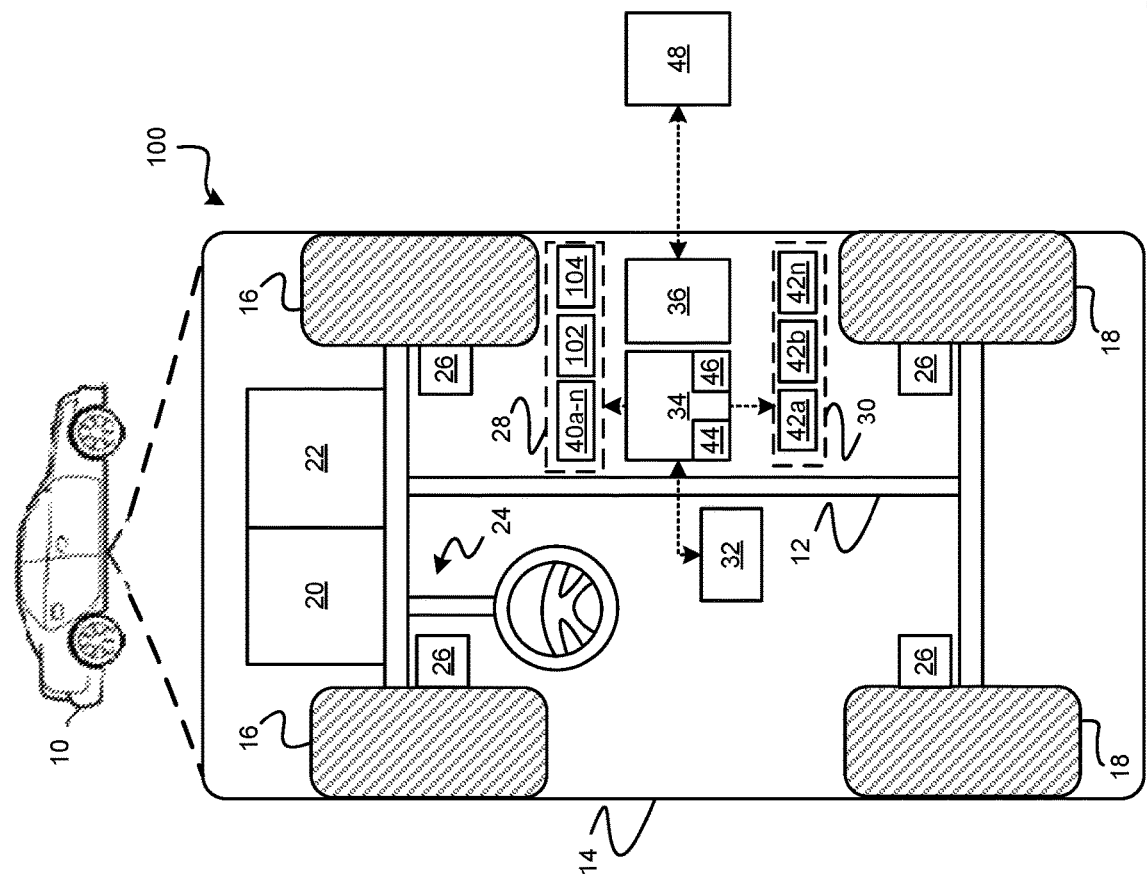
FIG. 1 is a functional block diagram illustrating an autonomous vehicle having an image sensor calibration system, in accordance with various embodiments.

With reference to FIG. 1, a calibration system shown generally at 100 is associated with a vehicle 10 in accordance with various embodiments. As will be discussed in more detail below, the calibration system 100 calibrates a radar system of the vehicle 10 using an optimized calibration procedure for sampling the radar returns. In various embodiments, the optimized calibration procedure is based on the output of a machine learning process that minimizes the number of measurement points as well as optimizes a path taken to obtain the measured points.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the calibration system 100 is incorporated or associated with the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments the vehicle 10 may be other levels of automation or non-autonomous.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensing devices include the radar system.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
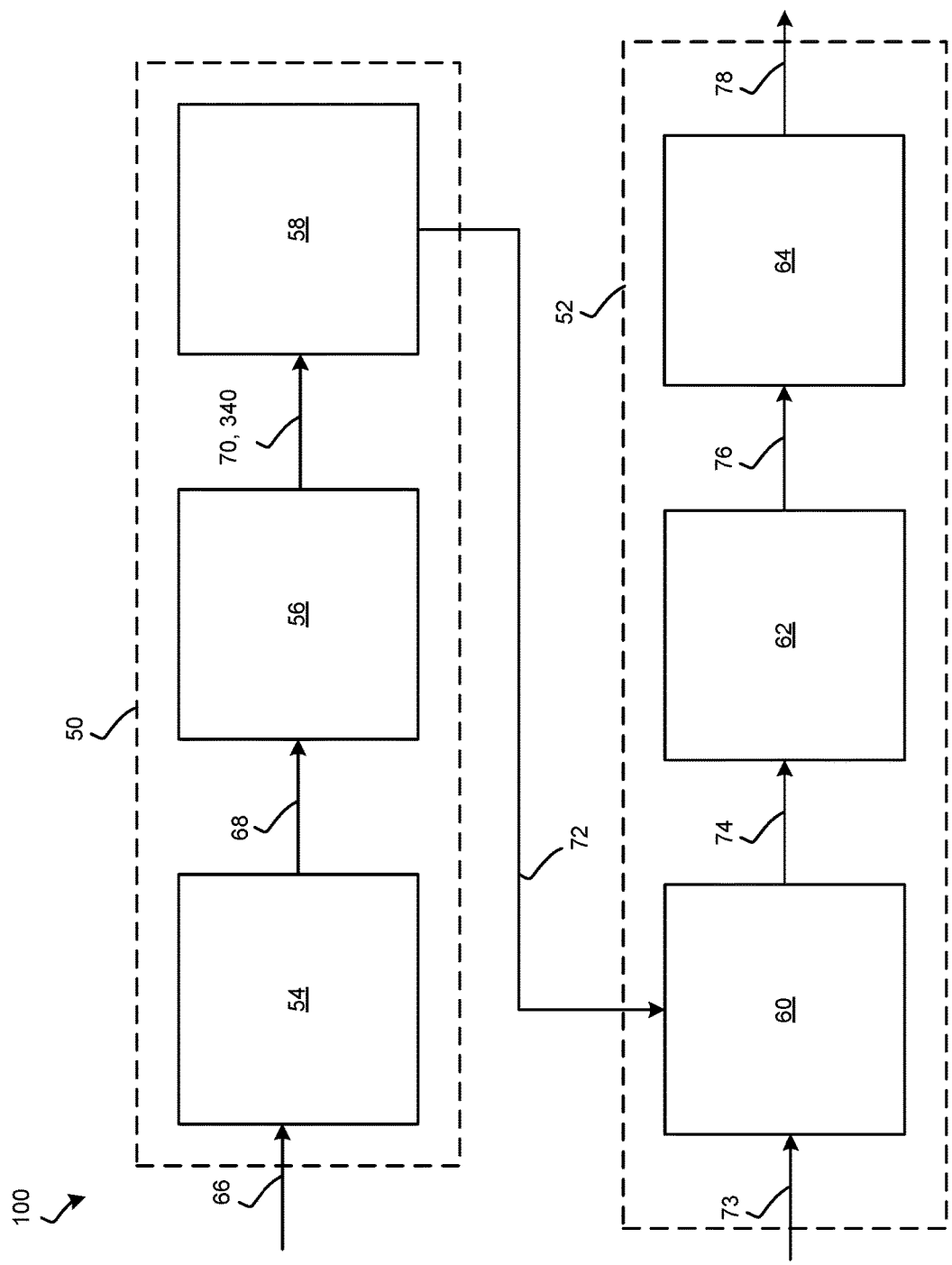
FIG. 2 is dataflow diagrams illustrating a calibration system associated with the autonomous vehicle, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the calibration system 100 and, when executed by the processor 44, sample radar returns according to the optimized calibration procedure that minimizes the sampling of the radar returns. As can be appreciated, in various embodiments, these instructions may also be embodied in a calibration controller (not shown) that is separate from the vehicle 10, for example, associated with a production process or embodied partially in a calibration controller and partially in the vehicle controller 34.

As can be appreciated, the subject matter disclosed herein provides certain enhanced features and functionality to what may be considered as a standard or baseline autonomous vehicle 10 and/or an autonomous vehicle based remote transportation system. To this end, an autonomous vehicle and autonomous vehicle based remote transportation system can be modified, enhanced, or otherwise supplemented to provide the additional features described in more detail below.

With reference now to FIG. 2 and with continued reference to FIG. 1, a dataflow diagram illustrates the calibration system 100 in accordance with various embodiments. As can be appreciated, various embodiments of the calibration system 100, according to the present disclosure, may include any number of sub-modules. For example, the sub-modules shown in FIG. 2 may be combined and/or further partitioned to similarly calibrate the radar system of the vehicle 10. As discussed above, inputs to the calibration system include data obtained from radar returns of the radar system in a controlled calibration environment. In various embodiments, the calibration system 100 includes an offline calibration system 50 and an online calibration system 52. The offline calibration system 50 includes a data collection module 54, a machine learning module 56, and a script generation module 58. In various embodiments, the functions of the modules 50, 54 of the offline calibration system 50 are performed offline, or once for all radar systems, for example, as a pre-calibration process for any number of vehicles.

In various embodiments, the online calibration system 52 includes a data sampling module 60, a data interpolation module 62, and a calibration module 64. In various embodiments, the functions of the modules 58-64 of the online calibration system 52 are performed online, for example, as the calibration process for the vehicle 10.

As shown in FIG. 2, the data collection module 54 receives radar data 66 generated by scanning through a controlled calibration environment (for example in a test environment or an anechoic chamber) in one degree increments in angle between negative sixty degrees and sixty degrees in azimuth as well as negative forty five and forty five degrees in elevation. The radar data 66 can include any number of scans by the radar of the vehicle 10 or of other vehicles (not shown) in a test pool. For each scan, the data collection module 54 generates a beam forming matrix of complex in-phase and quadrature (IQ) data based on the received radar data 66. In various embodiments, the matrix includes 11,011 data points. As can be appreciated, the matrix can include any number of data points. The data collection module 54 collects and stores the generated matrices as a training set of matrices 68.

The machine learning module 56 receives the training set of matrices 68. The machine learning module 56 processes the set of matrices 68 with a machine learning method to identify a minimum number of required angular combinations, otherwise referred to as centroids, and to find an optimized rotator path between the angular combinations. As can be appreciated, examples of machine learning methods include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), and linear discriminant analysis models.

Figure 3:
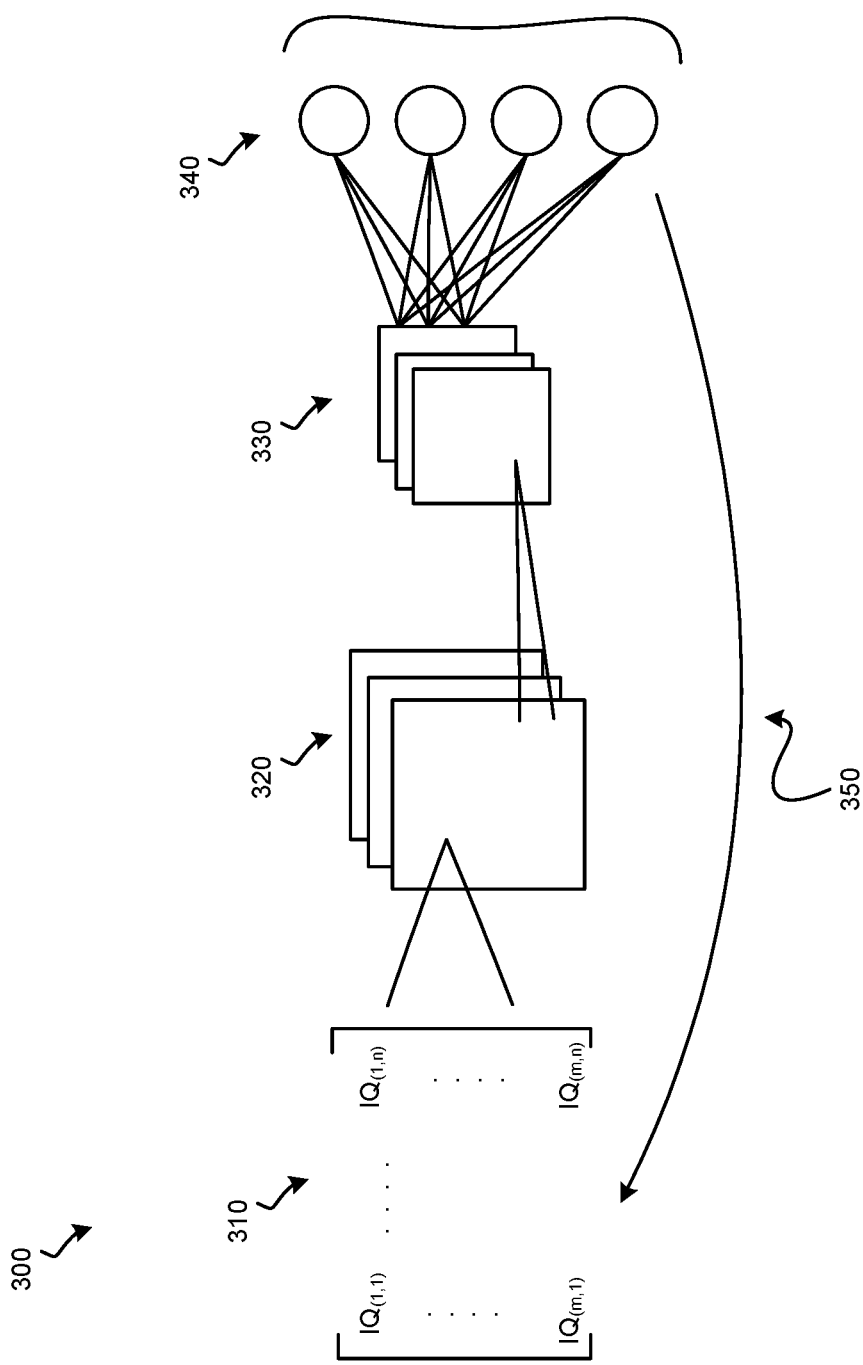
FIG. 3 is an exemplary convolutional neural network that may be implemented by the calibration system of FIG. 2, in accordance with various embodiments.

In various embodiments, the machine learning method is a convolutional neural network (CNN). As shown in FIG. 3, an example CNN 300 generally includes an input phase 310 that receives the training set of matrices 68. The CNN 300 further includes a convolution phase 320 and a subsampling phase 330. The convolution phase 320 includes a series of hidden layers that learn patterns in the IQ data points, cluster interdependent points, and create centroids for each created cluster. Each layer is a filter that performs convolution to extract independent features. The subsampling phase 930 then performs subsampling on the extracted features to reduce computational complexity and thereby outputting the centroids 340 representing interdependent clusters. In various embodiments, subsampling might involve taking an average or a maximum value over a sample of the inputs 68.

In general, the CNN 300 illustrated in FIG. 3 may be trained in an unsupervised mode for example, by use of backpropagation 350 to refine the training of CNN 300.

With reference back to FIG. 2, the resulting model is then implemented within machine learning module 56 of FIG. 2. Subsequently, during normal operation, the trained CNN 300 is used to process training set 68. Thereafter, the machine learning module 56 evaluates the resulting centroids 340 to provide an optimized path 70 for obtaining the scan data.

The script generation module 58 receives the identified centroids 340 and the optimized path 70. Based on the identified centroids 340 and the path 70, the script generation module 58 generates a script including steps to be performed by the calibration system 100. The steps instruct the calibration system 100 to scan the environment with the radar at the identified cluster points in the order identified by the path.

The data sampling module 60 receives the script 72 and uncalibrated radar 73 and performs the steps of the script to obtain the IQ data 74 for each centroid. The data interpolation module 62 receives the obtained IQ data 74 for each centroid and interpolates the sampled IQ data to populate IQ data for the remaining data points (the data points outside of the centroid). Thus, the data sampling module 60 generates a dense matrix 76 based on the obtained IQ data 74 and the interpolated data.

The calibration module 64 receives the dense matrix 76 and calibrates the radar system 10 based thereon. For example, the calibration module 64 uploads the dense matrix 76 as a calibration 78 to a data storage device of the radar system.

Implemented in this manner, the calibration system 100 uses pre-calibration data to limit motion time by finding a minimum number of angular combinations required to generate a comparable, sparse beam forming matrix, and leverages reinforcement learning to optimize the path to be taken by the rotator of the radar system to scan through all of the combinations.

Figure 4:
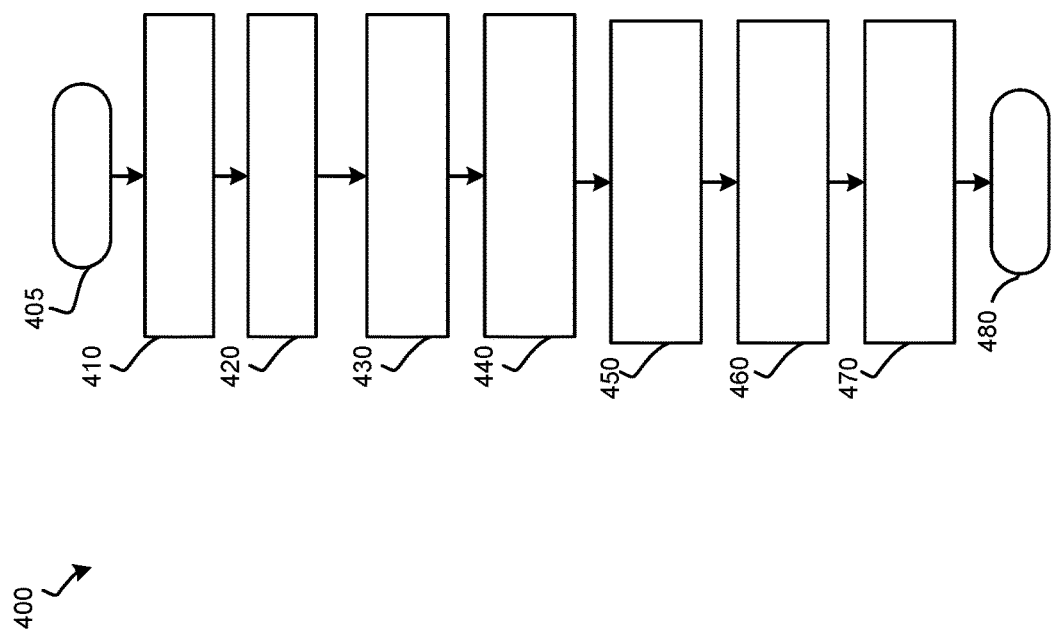
FIG. 4 is a flowchart illustrating a calibration method calibrating a radar system of the autonomous vehicle, in accordance with various embodiments.

Referring now to FIG. 4, and with continued reference to FIGS. 1-3, a flowchart illustrates a calibration method 400 that can be performed by the calibration system 100 of FIG. 1 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the autonomous vehicle 10.

In one example, the method may begin at 405. The training set of matrices 68 is collected at 410. The machine learning method is performed on the training set of matrices 68 to train the CNN 300 to find the centroids 340 at 420. The optimized path 70 is generated from the identified centroids 340 at 430. The script 72 is then generated from the centroids 340 and optimized path 70 at 440. The optimized scan is then performed by the calibration system on an individual radar to obtain IQ data 74 at 450. Interpolation is performed on the obtained IQ data 74 at 460 to generate the dense matrix 76. The dense matrix 76 is then installed into the radar at 470 and the radar is now calibrated. Thereafter, the method may end at 480.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of calibrating a radar system of a vehicle, comprising:
commanding, by a processor, a rotator to rotate the radar system according to a first scan;
receiving, by a receiver, signals based on the first scan;
forming at least one matrix of data based on the first scan of the radar system;
generating, by the processor, a training set of data based on the at least one matrix;
processing, by the processor, the training set with a machine learning method to obtain centroids of interdependent clusters within the training set, wherein the machine learning method includes a convolutional neural network that includes an input that receives the at least one matrix, a convolutional phase that filters data in the at least one matrix to extract interdependent features, and a subsampling phase that subsamples the interdependent features to reduce computational complexity, and an output that produces the centroids;
identifying, by the processor, an optimized path of radar scan based on the centroids of independent clusters;
obtaining, by the processor, a dense matrix of sample data based on the optimized path; and
calibrating, by the processor, a scan path of the radar system based on the dense matrix.

2. The method of claim 1, further comprising generating, by a processor, a script to sample data based on the centroids; and wherein the obtaining the dense matrix is based on the script.

3. The method of claim 1, wherein the training set of data includes complex in-phase and quadrature (IQ) data.

4. The method of claim 1, further comprising performing a scan by the radar system based on the centroids and the optimized path to obtain sample data; interpolating between the sample data to obtain the dense matrix including the sample data and the interpolated data.

5. The method of claim 1, wherein the convolution neural network further includes backpropagation based on the centroids.

6. The method of claim 1, wherein the steps of obtaining and processing are performed offline, and wherein the step of calibrating is performed online.

7. A system for calibrating a radar system of a vehicle, comprising:
a rotator configured to rotate at least one radar system according to a first scan;
a receiver configured to receive signals based on the first scan;
a first non-transitory module that, by a processor, obtains a training set of data from the signals of the at least one radar system, wherein the training set includes at least one matrix of data associated with the first scan of the radar system;
a second non-transitory module that, by the processor, processes the training set with a machine learning method to obtain centroids of interdependent clusters within the training set, that identifies an optimized path of a radar scan based on the centroids of independent clusters, and obtains a dense matrix of sample data based on the optimized path, wherein the machine learning method includes a convolutional neural network that includes an input that receives the at least one matrix, a convolutional phase that filters data in the at least one matrix to extract interdependent features, and a subsampling phase that subsamples the interdependent features to reduce computational complexity, and an output that produces the centroids; and
a third non-transitory module that, by the processor, calibrates a scan path of the radar system based on the dense matrix.

8. The system of claim 7, further comprising a fourth non-transitory module that, by a processor, generates a script to sample data based on the centroids; and wherein the second non-transitory module obtains the dense matrix based on the script.

9. The system of claim 7, wherein the training set of data includes complex in-phase and quadrature (IQ) data.

10. The system of claim 7, further comprising a fourth non-transitory module that, by a processor, performs a scan by the radar system based on the centroids to obtain the sample data; and a fifth non-transitory module that, by a processor, interpolates between the sample data to obtain the dense matrix including the sample data and the interpolated data.

11. The system of claim 7, wherein the convolution neural network further includes backpropagation based on the centroids.

12. The system of claim 7, wherein the first non-transitory module and the second non-transitory module perform functions offline, and wherein the third non-transitory module performs functions online.

* * * * *